US009486836B2

(12) United States Patent
Strong et al.

(10) Patent No.: US 9,486,836 B2
(45) Date of Patent: Nov. 8, 2016

(54) ORE SCREENING PANEL FASTENER

(71) Applicant: SCHENCK PROCESS AUSTRALIA PTY LTD, Sunshine, VIC (AU)

(72) Inventors: Craig Strong, Baldivis (AU); Murugavel Thangavelu, Point Cook (AU); Mark Lamplugh, Gisborne (AU); Martin Schuetz, Point Cook (AU)

(73) Assignee: SCHENECK PROCESS AUSTRALIA PTY LTD (AU)

( * ) Notice: Subject to any disclaimer, the term of this patent is extended or adjusted under 35 U.S.C. 154(b) by 0 days.

(21) Appl. No.: 14/785,690

(22) PCT Filed: Apr. 22, 2014

(86) PCT No.: PCT/AU2014/000450
§ 371 (c)(1),
(2) Date: Oct. 20, 2015

(87) PCT Pub. No.: WO2014/172745
PCT Pub. Date: Oct. 30, 2014

(65) Prior Publication Data
US 2016/0089698 A1   Mar. 31, 2016

(30) Foreign Application Priority Data
Apr. 23, 2013   (AU) ................. 2013901415

(51) Int. Cl.
*B07B 1/49*   (2006.01)
*B07B 1/46*   (2006.01)
*F16B 35/06*  (2006.01)
*F16B 19/10*  (2006.01)

(52) U.S. Cl.
CPC ............ *B07B 1/4645* (2013.01); *B07B 1/46* (2013.01); *F16B 35/06* (2013.01); *F16B 19/1081* (2013.01)

(58) Field of Classification Search
CPC ................................ B07C 1/4645
USPC ............................. 209/405
See application file for complete search history.

(56) References Cited

U.S. PATENT DOCUMENTS 4,420,859 A * 12/1983 Hammerle ........... F16B 21/06
                                             24/595.1
6,260,711 B1 * 7/2001 Woodgate ........... B07B 1/4645
                                             209/399
6,957,741 B2 * 10/2005 Freissle ................ B07B 1/46
                                             209/405

(Continued)

FOREIGN PATENT DOCUMENTS

ES   2345864    10/2010
WO   2010014881  2/2010

OTHER PUBLICATIONS

Corresponding International Search Report and Written Opinion for PCT/AU2014/00450 dated May 13, 2014.

*Primary Examiner* — Terrell Matthews
(74) *Attorney, Agent, or Firm* — The Belles Group, P.C.

(57) ABSTRACT

A headed retention pin is proposed that seats into recesses in the lower adjoining edges of two screening panels. The heads are tapered vertical from the upper surface of the head to the lower edge of the panels and tapered horizontally from the outer edge of the heads toward the center line of the head which lies on the join line of the two adjacent panels. These appear to be an X in plan view. The advantage is that as well as locating the panels correctly and retaining the panels on the frame they also pull the adjacent panels together to reduce ingress of fines between the panels.

16 Claims, 5 Drawing Sheets

(56) References Cited

U.S. PATENT DOCUMENTS

| | | | | |
|---|---|---|---|---|
| 7,946,428 B1 * | 5/2011 | Lane | | B07B 1/4645 209/395 |
| 8,025,154 B2 * | 9/2011 | Kriel | | B07B 1/4645 209/363 |
| 8,123,043 B2 * | 2/2012 | McGregor | | B07B 1/4645 209/319 |
| 8,281,934 B1 * | 10/2012 | Connolly | | B07B 1/4645 209/392 |
| 9,186,703 B2 * | 11/2015 | Lane | | B07B 1/4645 |
| 2006/0108264 A1 * | 5/2006 | Moore | | B07B 1/4645 209/395 |
| 2006/0291978 A1 * | 12/2006 | Panasik | | F16B 23/0092 411/378 |
| 2011/0116895 A1 * | 5/2011 | Garver | | F16B 23/0007 411/402 |

\* cited by examiner

ORE SCREENING PANEL FASTENER

PRIORITY

Priority is claimed as a national stage application, under 35 U.S.C. §371, to international patent application No. PCT/AU2014/000450, filed Apr. 22, 2014, which claims priority to Australian patent application 2013901415, filed Apr. 23, 2013. The disclosures of the aforementioned priority applications are incorporated herein by reference in their entirety.

This invention relates to modular panels used in vibratory screening machines of the type used in mining and quarrying and in particular to a system and fasteners for fastening the panels to the frame.

BACKGROUND TO THE INVENTION

Australian patent 482212 proposed a modular screening panel system for ore screening decks which is now widely used by the mining industry and replaced the earlier screening cloths, and large wire screening frames. The screening panels were all of the same size [eg. 300 mm] and made of reinforced polyurethane. The panels are adapted to be secured to an underlying support frame using dependent spigots which are a force fit into corresponding apertures in the support frame A variety of methods have evolved for securing modular panels to the screening machines which use pin expanded spigots or edge flanges and all require complementary support frames which need to be assembled to the machine frame. Typical embodiments of these various systems are disclosed in patents 517319, 556953, 559443, 700843, 711096, 742060 and 755595.

In recent times a number of proposals have used fastening systems that engage in recesses in the underside of the edge of panels. These include Australian patents 2002300432 and 2009201671 marketed as the Polysnap™ system and U.S. Pat. Nos. 7,946,428, 8,281,934, 8,025,154 and 8,123,043.

These systems hold the panels together but a common problem is that fines can enter between abutting panels and cause wear of the panels and the underlying frame because the panels are not tightly pressed together.

It is an object of this invention to ameliorate this problem in the prior art.

BRIEF DESCRIPTION OF THE INVENTION

To this end the present invention provides a screening panel and fastener combination in which the fastener is securable to a panel support frame and incorporates a head that fits into recesses in the lower edge of two adjacent screening panels wherein the head varies in cross sectional area in the vertical direction away from the support frame and decreases in width in the horizontal direction from its outer edge toward its centreline which lies along the line of abutment of adjacent panels. The two recesses together are of complementary shape to the shape of the head.

The device is primarily x shaped and attaches to screen media support structure, protruding from the screen media support structure. The screen media panels interlock onto the x shape protrusion, this also secures the adjacent screening media panels to each other.

This invention provides a headed retention pin that seats into recesses in the lower adjoining edges of two panels. The heads are preferably tapered in part in the vertical direction from the upper surface of the head to the lower edge of the panels to provide resistance in the vertical direction against the correspondingly shaped recess in the panels. In the vertical direction the head may incorporate a waist portion to define the end of the tapered portion. The head is also tapered horizontally from the outer edge of the heads toward the centreline of the head, which lies on the join line of the two adjacent panels, and which exerts a resistance in the horizontal plane to prevent the panels moving apart. The heads appear to be an X in plan view. The advantage is that as well as locating the panels correctly and retaining the panels on the frame they also pull the adjacent panels together to reduce ingress of fines between the panels. An additional horizontal undercut or a waist portion may be provided to increase the vertical hold down force of the fastener. A relief may be added to the lower section (and on the panel) to help installation and de-installation. The fastener may be securable to the panel support frame by any conventional means including a. a threaded for bolting to the support structure
b. additional pin expanded spigot arrangement
c. Pin shaped protrusion to suit pin fixing rails such as disclosed in Australian patent 2009200159

The attachment may be directly to the machine frame or to an intermediate panel support frame including adapters as described in Australian patents 736500, 2003204125, 2009101092.

The head holding force may be enhanced by variation of the screening media supporting frame. Increased area is utilized for the fixing pin by letting the frame over the head instead of around. The expected panel holding force may increase significantly.

The head has a recess which allows the alignment of heads with each other with a simple steel ruler or similar alignment device during assembly.

DETAILED DESCRIPTION OF THE INVENTION

A preferred embodiment of the invention will be described with reference to the drawings in which.

Figure 18:
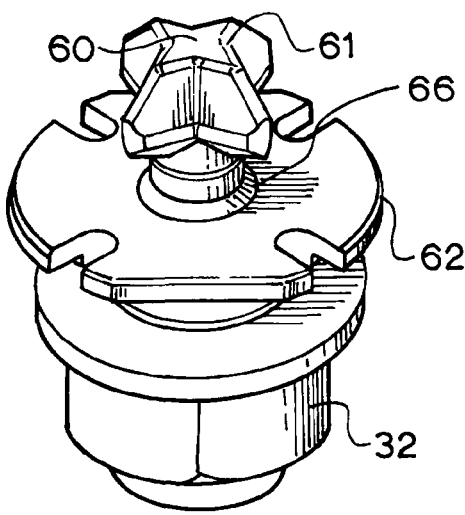
FIG. 18 is an isometric view of another embodiment of a bolt on version of the fastener of this invention.
Figure 19:
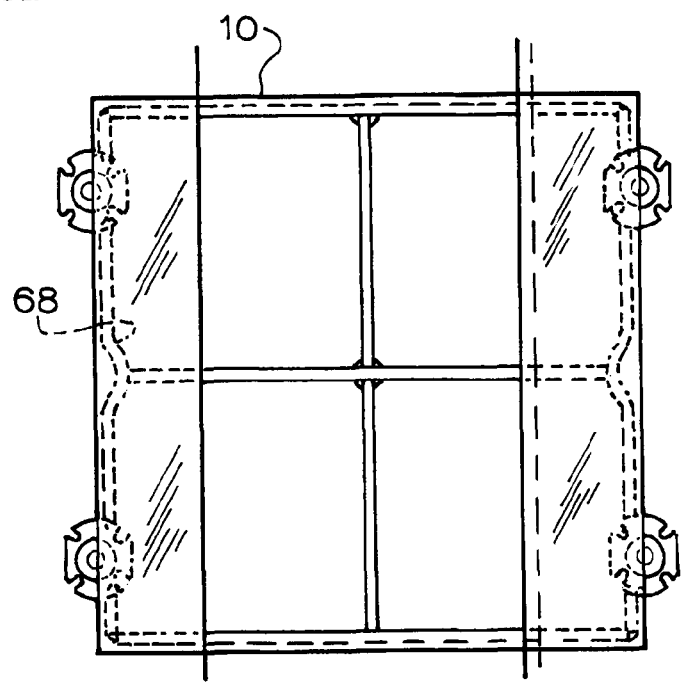
FIG. 19 illustrates a plan view of the fastener of FIG. 18 secured to a panel.
Figure 20:
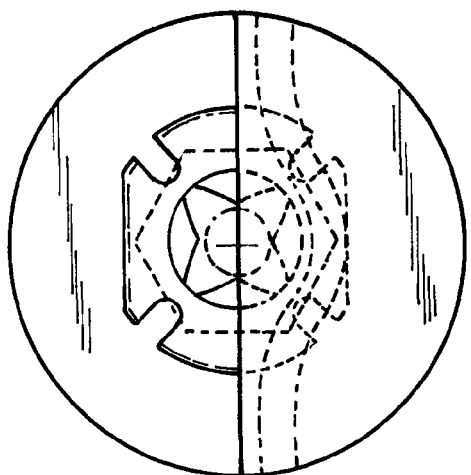
Figure 21:
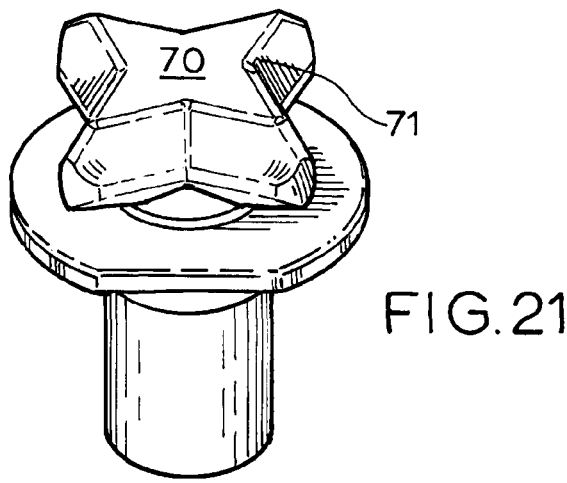
Figure 22:
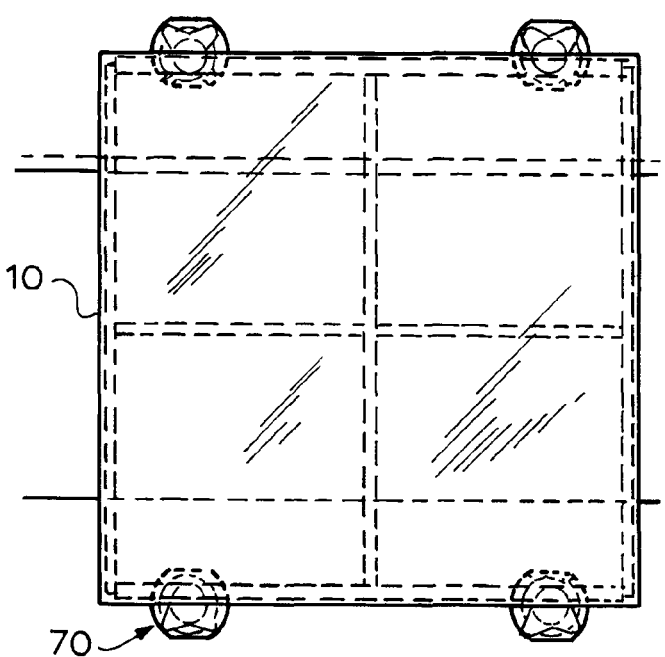
Figure 23:
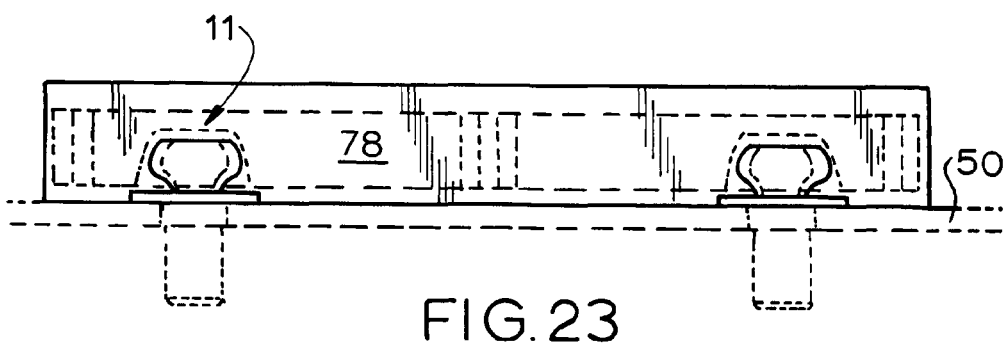

And FIG. 20 is a detail of FIG. 19 illustrating the reinforcing arrangement of the panel to accommodate the fastener of FIG. 18;

FIG. 21 is an isometric view of yet another embodiment of the fastener of this invention;

FIG. 22 illustrates a plan view of the fastener of FIG. 21 secured to a panel;

FIG. 23 is a schematic side view of the panel of FIG. 22 illustrating the reinforcing arrangement of the panel to accommodate the fastener of FIG. 21.

Figure 1:
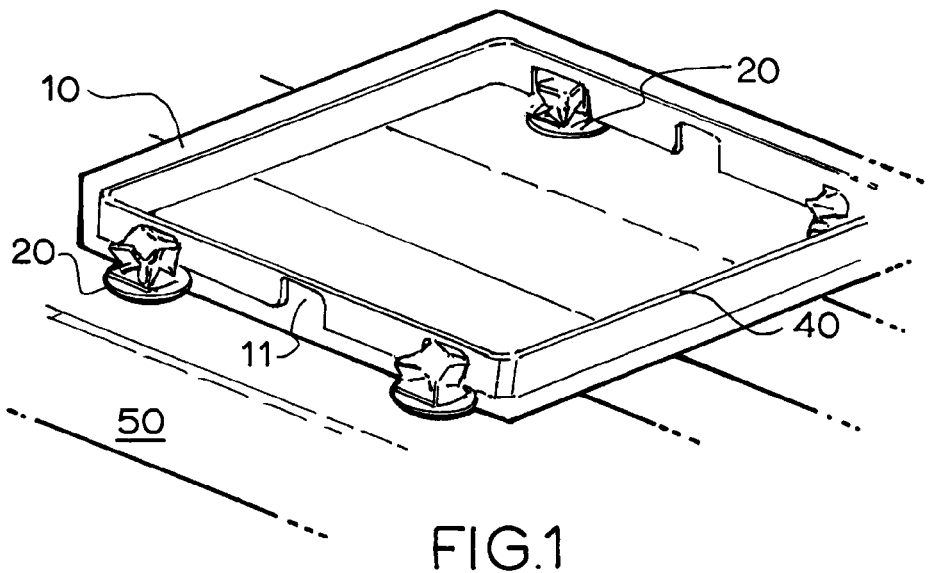
FIG. 1 is a perspective illustration of a panel and fastener arrangement according to one embodiment of this invention.
Figure 2:
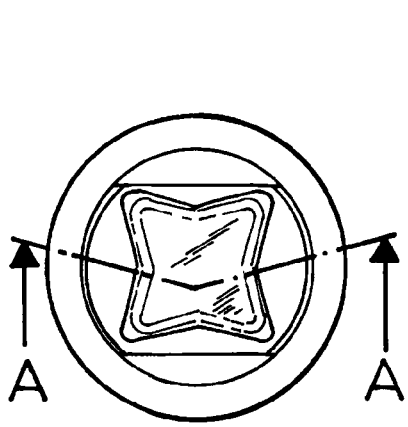
FIG. 2 is a plan view of a first embodiment of a fastener of this invention.
Figure 3:
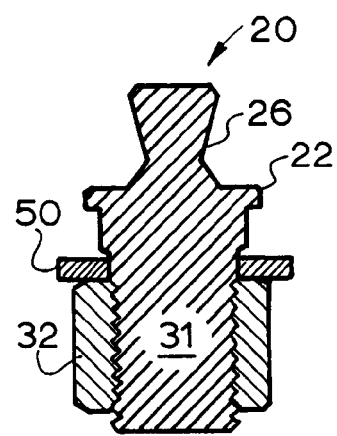
FIG. 3 is a sectional view of the fastener of FIG. 2.
Figure 4:
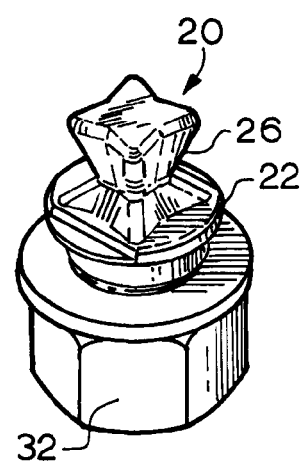
FIG. 4 is an isometric view of the fastener of FIG. 2.
Figure 5:
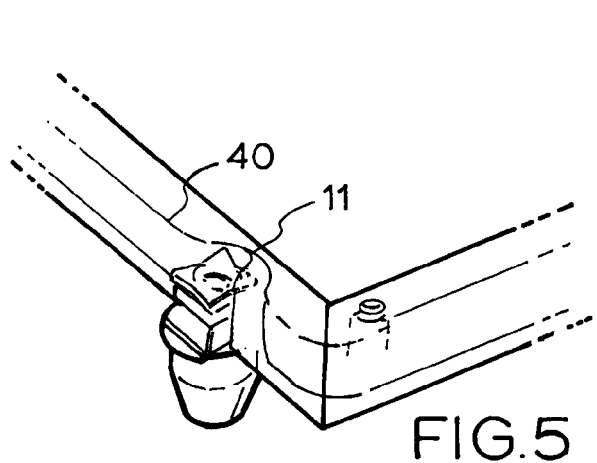
FIG. 5 is a view of another embodiment of the panel and fastener of this invention.
Figure 6:
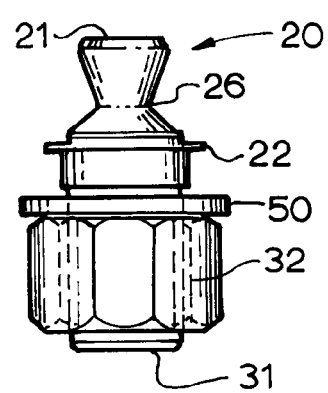
FIG. 6 is a side view of the fastener of FIG. 2.

As shown in FIGS. 1 and 5 the system of this invention includes a panel 10 having recesses 11, and a reinforcing frame 40 in combination with a fastener having a head 20 and a securing portion 30 attached to a support frame 50. As shown in FIGS. 2 to 5 and 6 the fastener consists of a head 20 with a centre line 21 and a securing portion in this embodiment of a screw threaded shaft 31 and associated nut 32 holding the fastener to the frame 50.

The head 20 is preferably symmetrical so that any side can fit into the complementary recess 11 of the panels 10 when oriented between two abutting panels the centre line 21 aligns with the line of abutment between two adjacent panels. In this orientation it can be seen that the head is downwardly tapered toward the support frame 50 and inwardly tapered horizontally toward the centre line 21. In plan the shape resembles an X. The head incorporates a base flange 22 below a waist portion 26.

Figure 7:
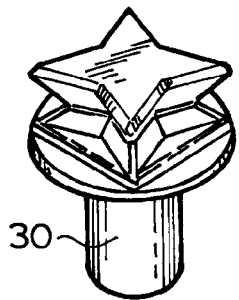
FIG. 7 is an isometric view of a second embodiment of a fastener of this invention.
Figure 8:
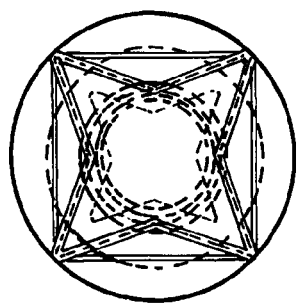
FIG. 8 is a plan view of the fastener of FIG. 7.
Figure 9:
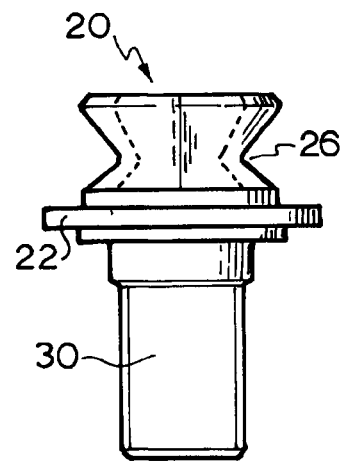
FIG. 9 is a side view of the fastener of FIG. 7.
Figure 11:
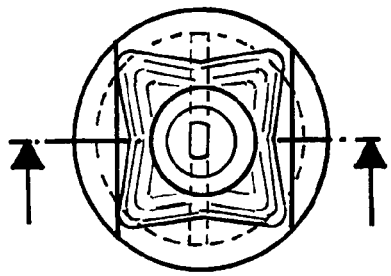
FIG. 11 is a plan view of the fastener of FIG. 10.
Figure 10:
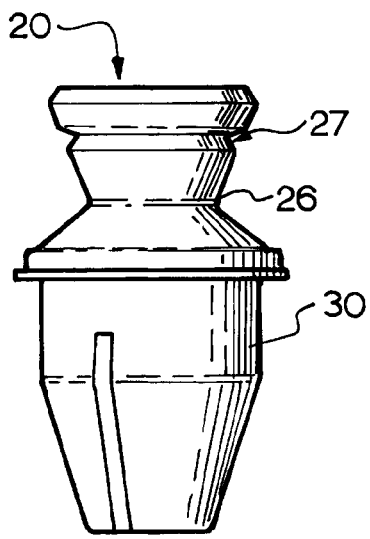
FIG. 10 is a perspective view of a third embodiment of this invention.
Figure 12:
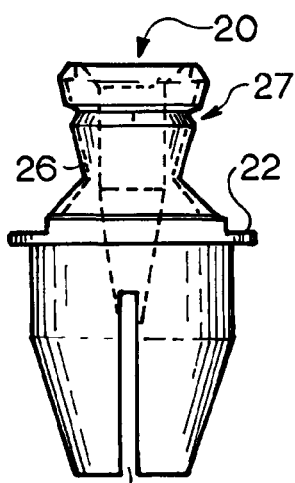
FIG. 12 is a side view of the fastener of FIG. 10.
Figure 13:
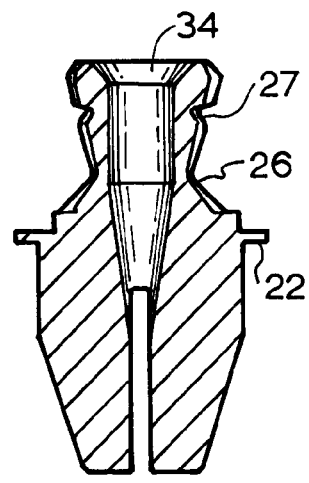
FIG. 13 is a sectional view of the fastener of FIG. 10.

FIGS. 7, 8 and 9 illustrate a second embodiment with another symmetrical head shape with the same elements as those in embodiment 1.

The third embodiment shown in FIGS. 10 to 13 has another symmetrical head shape with the same elements as in embodiment 1. In addition the head incorporates an additional horizontal undercut 27 to increase the vertical hold down force of the fastener. The body portion uses a different but known pin expanded fastening arrangement whereby a pin inserted into the hollow bore 34 expand the portion 30 by virtue of the slot 35 to retain the fastener in the frame 50. The cylindrical pin will have a cylindrical head to ensure that the pin is not assembled too far into the head and thus ensuring a correct fit. The pin head may be thin enough to allow an easier disassembly of the fastener by breaking the pin head off e.g. with a hammer and mallet.

Figure 14:
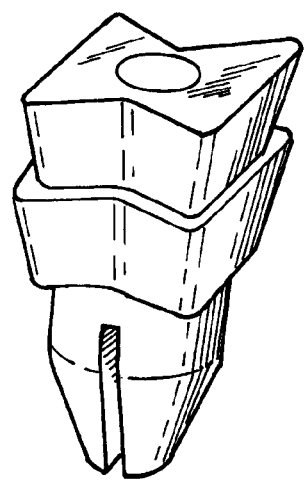
FIG. 14 is a perspective view of a fourth embodiment of the fastener of this invention.

For thick and rubber panels a fourth embodiment shown in FIG. 14 may be used. This incorporates a double head.

The wedge configuration for half the head, as seen in plan view, functions to pull the panel toward the centre line of the head, which is also the line of abutment of two adjacent panels. This ensures that the line of abutment is tight and resists the ingress of abrasive fines. The vertical tapering of the head serves a similar function in holding the panels onto the support frame.

Figure 15:
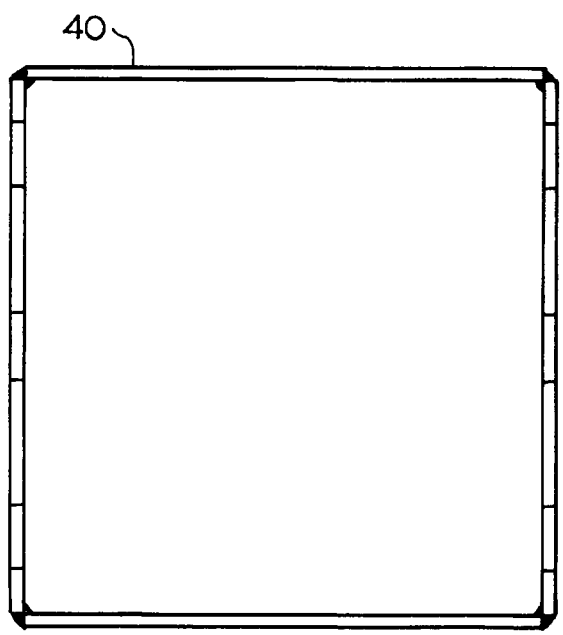
FIG. 15 is a plan view of an embodiment of the reinforcing frame of one embodiment of this invention.
Figure 16:
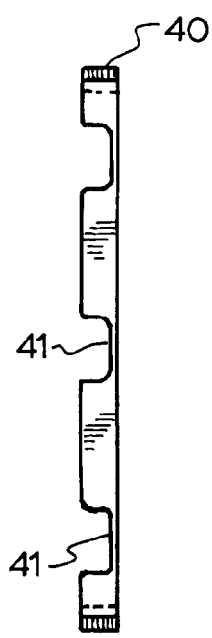
FIG. 16 is aside view of FIG. 15.
Figure 17:
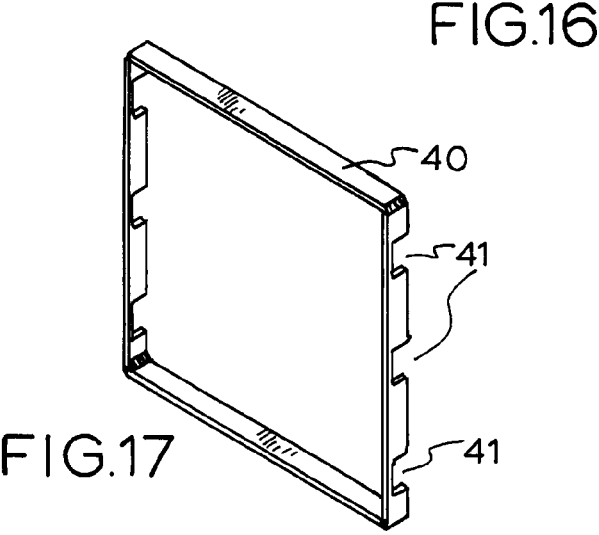
FIG. 17 is an isometric view of FIG. 15.

The reinforcing frame may be as shown in FIG. 5 where the reinforcing frame is bent around the recess 11 in the panel or as shown in FIGS. 15 to 17 where the reinforcing frame is shaped to pass over the recess in the panel rather than around it. This creates recesses 41 in the reinforcing frame.

In FIGS. 18 to 20 a bolt on pin is illustrated for a panel.

The head 60 is preferably symmetrical so that any side can fit into the complementary recess 11 of the panels 10 when oriented between two abutting panels the centre line 61 aligns with the line of abutment between two adjacent panels. In this orientation it can be seen that the head tapers out and then in toward the support frame 50 and is inwardly tapered horizontally toward the centre line 61. In plan the shape resembles an X. The head incorporates a base flange 62 below a waist portion 66. In the panel the reinforcing frame 68 is bent to curve around the complementary recess 11 for the head as shown in FIGS. 19 and 20. In FIGS. 21 to 23 an oversize head is illustrated that requires a deeper recess into the edge of the panel.

The head 70 is preferably symmetrical so that any side can fit into the complementary recess 11 of the panels 10 when oriented between two abutting panels the centre line 71 aligns with the line of abutment between two adjacent panels. In this orientation it can be seen that the cross sectional area of the varies in the vertical direction toward the support frame 50 and inwardly tapered horizontally toward the centre line 61. In plan the shape resembles an X. In the panel the reinforcing frame 78 is bent to curve over the complementary recess 11 for the head as shown in FIGS. 22 and 23.

From the above it can be seen that this invention provides a fastener that provides a unique mechanism for securing modular panels together and in reducing the ingress of abrasive fines between abutting panels.

Those skilled in the art will realize that this invention has been described with reference to some particular embodiments but may be implemented in other embodiments without departing from the core teachings of this invention.

The invention claimed is:

1. A screening panel and fastener combination in which the fastener is securable to a panel support frame and incorporates a head that fits into recesses in the lower edge of two adjacent screening panels wherein the fastener head varies in cross sectional area in the vertical direction away from the support frame and decreases in width in the horizontal direction from its outer edge toward its centre line, the adjacent panels engaging the fastener head along the centre line to form a line of abutment therebetween, the fastener head exerting a resistance in the horizontal plane to prevent the adjacent panels from moving apart.

2. A screening panel and fastener combination as claimed in claim 1 in which the two recesses together are of complementary shape to the shape of the fastener head.

3. A screening panel and fastener combination as claimed in claim 1 in which the head is symmetrical and resembles an X in plan view.

4. A screening panel and fastener combination as claimed in claim 1 in which the panel incorporates a reinforcing frame embedded within the periphery of the panel wherein the frame is shaped to pass around or over the recesses in the panel edges.

5. A fastener for use in combination with screening panels, the fastener comprising a portion securable to a panel support frame and a head that fits into recesses in the lower edge of two adjacent screening panels wherein the head decreases in cross sectional area in the vertical direction from a top surface to the lower edge of the screening panels and decreases in width in the horizontal direction from its outer edge to its centre line which lies along the line of abutment of adjacent panels.

6. A fastener as claimed in claim 4 in which the head is symmetrical and resembles an X in plan view.

7. A screening panel and fastener combination as claimed in claim 1 in which the head incorporates a waist portion in the vertical direction.

8. A screening panel and fastener combination as claimed in claim 1 in which the securing portion is a threaded shaft.

9. A screening panel and fastener combination as claimed in claim 1 in which the securing portion is a pin expanded spigot.

10. A fastener as claimed in claim 5 in which the head incorporates a waist portion in the vertical direction.

11. A fastener as claimed in claim 5 in which the securing portion is a threaded shaft.

12. A fastener as claimed in claim 5 in which the securing portion is a pin expanded spigot.

13. The screening panel and fastener combination as claimed in claim 1, wherein the fastener head tapers in the horizontal direction from the outer edge to the centre line which lies along the line of abutment of adjacent panels.

14. The screening panel and fastener combination as claimed in claim 1, wherein the fastener head varying in cross sectional area in the vertical direction exerts a resistance in a vertical plane to prevent the adjacent panels from moving in the vertical direction.

15. The screening panel and fastener combination as claimed in claim 7, wherein the fastener head includes a top surface and tapers in the vertical direction from the top head to the waist.

16. The fastener as claimed in claim 10, wherein the fastener head includes a top surface and tapers in the vertical direction from the top head to the waist.

\* \* \* \* \*